(12) United States Patent
Ishii et al.

(10) Patent No.: US 7,466,260 B2
(45) Date of Patent: Dec. 16, 2008

(54) RADAR APPARATUS

(75) Inventors: Toru Ishii, Nagaokakyo (JP); Motoi Nakanishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/946,696

(22) Filed: Nov. 28, 2007

(65) Prior Publication Data

US 2008/0088500 A1 Apr. 17, 2008

Related U.S. Application Data

(63) Continuation of application No. PCT/JP2006/311830, filed on Jun. 13, 2006.

(30) Foreign Application Priority Data

Jun. 17, 2005 (JP) .............................. 2005-177377

(51) Int. Cl.
*G01S 13/58* (2006.01)
*G01S 13/34* (2006.01)
(52) U.S. Cl. ........................................ 342/70; 342/109
(58) Field of Classification Search .................... 342/70, 342/109, 112, 128
See application file for complete search history.

(56) References Cited

U.S. PATENT DOCUMENTS

| | | | | |
|---|---|---|---|---|
| 6,067,048 A | * | 5/2000 | Yamada | 342/382 |
| 6,072,422 A | * | 6/2000 | Yamada | 342/70 |
| 6,121,917 A | * | 9/2000 | Yamada | 342/128 |
| 6,445,339 B1 | * | 9/2002 | Yamada | 342/128 |
| 2006/0181448 A1 | * | 8/2006 | Natsume et al. | 342/70 |
| 2008/0088500 A1 | * | 4/2008 | Ishii et al. | 342/109 |

FOREIGN PATENT DOCUMENTS

| | | |
|---|---|---|
| JP | 9-152477 | 6/1997 |
| JP | 9-222474 | 8/1997 |
| JP | 11-326504 | 11/1999 |
| JP | 2000-171540 | 6/2000 |
| JP | 2002-098753 | 4/2002 |
| WO | WO-98/12574 | 3/1998 |
| WO | WO 2006134912 A1 * | 12/2006 |

\* cited by examiner

*Primary Examiner*—Dan Pihulic
(74) *Attorney, Agent, or Firm*—Dickstein Shapiro LLP

(57) ABSTRACT

In a radar apparatus, IF beat signals are detected in a first section and a second section serving as two adjacent frequency up-modulation sections of a transmitted wave. Frequency conversions such as FFTs are performed on the IF beat signals so that the frequency spectra are obtained. Subsequently, peak frequencies are detected from the frequency spectra in the corresponding sections, and the phase difference between the peak frequencies is determined. Since the phase difference calculated in this manner depends on the relative moving distance $\Delta r$ during the interval between the first section and the second section, the relative moving distance $\Delta r$, the relative distance, and the relative velocity at this moment can be calculated from the phase difference.

9 Claims, 10 Drawing Sheets

FIG. 4
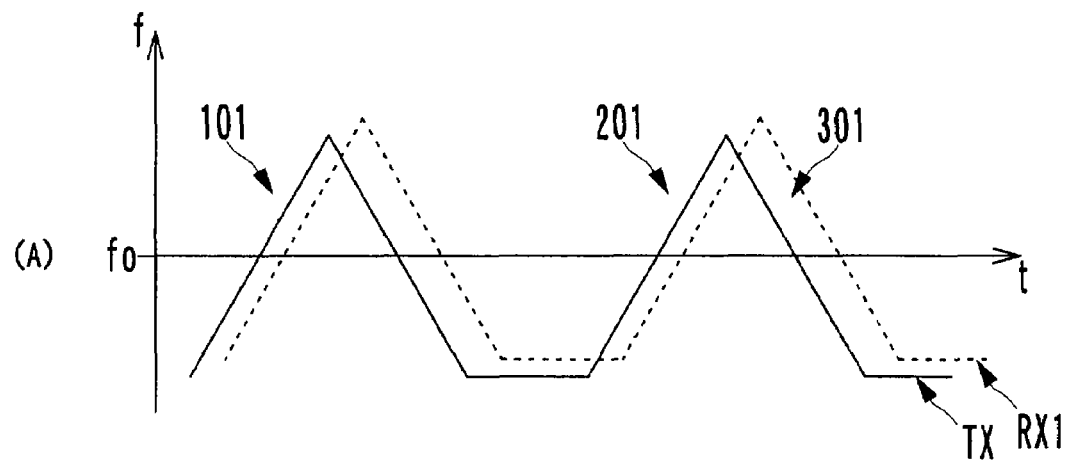
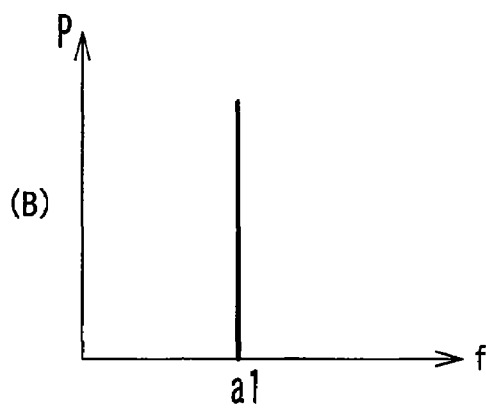
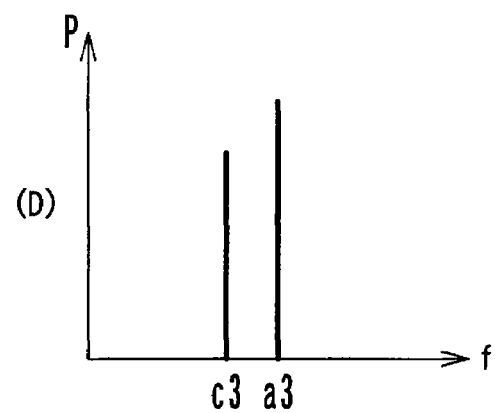
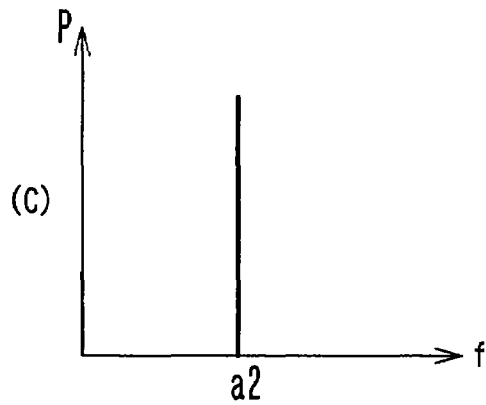
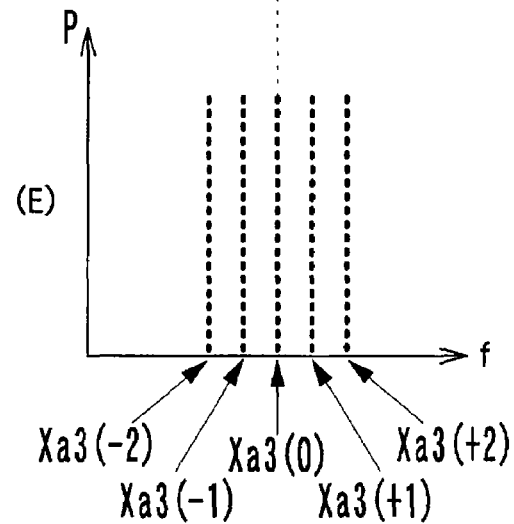

FIG. 10
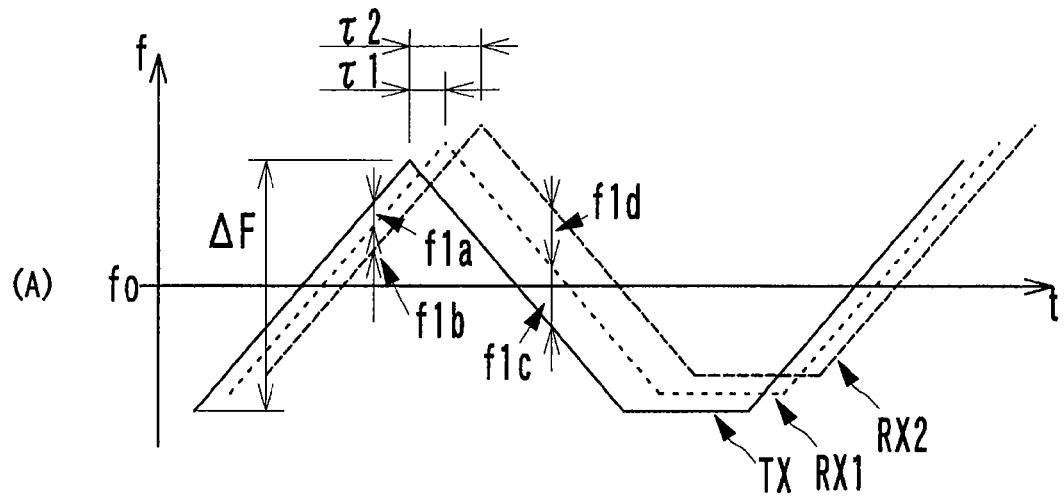
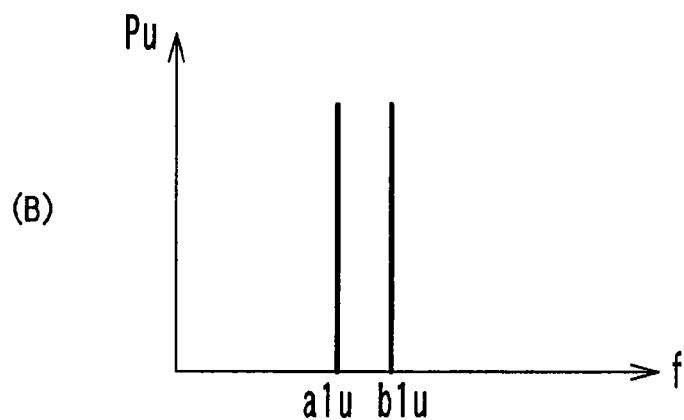
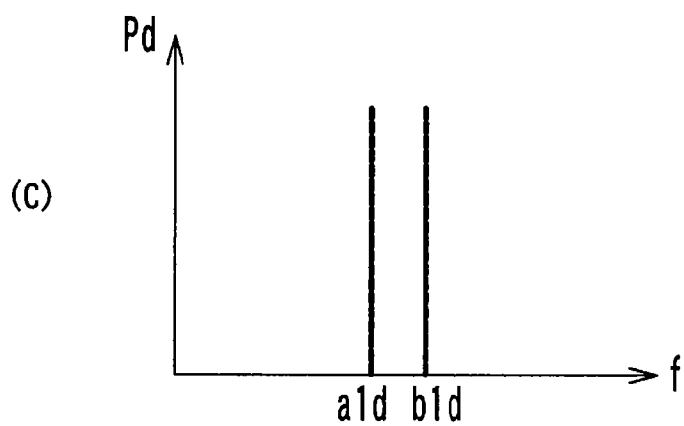

RADAR APPARATUS

CROSS REFERENCE TO RELATED APPLICATIONS

The present application is a continuation of International Application No. PCT/JP2006/311830, filed Jun. 13, 2006, which claims priority to Japanese Patent Application No. JP2005-177377, filed Jun. 17, 2005, the entire contents of each of these applications being incorporated herein by reference in their entirety.

FIELD OF THE INVENTION

The present invention relates to so-called FM-CW radar apparatuses that detect relative distances and relative velocities of target objects using transmitted millimeter waves whose frequencies are changed in a time-varying manner and received waves generated by reflection of the transmitted waves.

BACKGROUND OF THE INVENTION

Typical FM-CW radar apparatuses using millimeter waves used for, for example, preventing collisions of automobiles (hereinafter, simply referred to as "radar apparatuses") emit transmitted waves whose frequencies are changed in a time-varying manner, receive reflected waves generated by reflection of the transmitted waves from target objects, and calculate relative distances between automobiles equipped with the radar apparatuses and the target objects and relative velocities of the target objects with respect to the automobiles using the transmitted waves and the received waves.

In such radar apparatuses, how accurately the relative distances and the relative velocities can be calculated is recognized as a major challenge. In order to solve this, various radar apparatuses have been disclosed (for example, see Patent Documents 1 and 2).

Patent Document 1: Japanese Unexamined Patent Application Publication No. 11-326504

Patent Document 2: Japanese Unexamined Patent Application Publication No. 2002-98753

Known radar apparatuses including those described in the above-described patent documents generate beat signals using transmitted waves and received waves, and detect the frequency spectra of the beat signals. When transmitted waves having a triangular waveform are used, for example, peaks in the frequency spectra of beat signals in frequency up-modulation sections and those in frequency down-modulation sections are correspondingly paired and used for calculating relative distances or relative velocities.

However, as shown in FIGS. 10(A) to 10(C), correct pairing can be difficult when a plurality of received waves exist for one transmitted wave.

FIG. 10(A) illustrates waveforms of a transmitted wave and received waves in the case where a plurality of received waves resulting from one transmitted wave are measured, FIG. 10(B) illustrates a frequency spectrum in an up-modulation section, and FIG. 10(C) illustrates a frequency spectrum in a down-modulation section.

More specifically, when received waves RX1 and RX2 resulting from a transmitted wave TX and delayed from the transmitted wave by delay times $\tau 1$ and $\tau 2$, respectively, are measured, a peak $a1u$ corresponding to a frequency difference $f1a$ between the frequency of the transmitted wave TX and that of the received wave RX1 and a peak $b1u$ corresponding to a frequency difference $f1b$ between the frequency of the transmitted wave TX and that of the received wave RX2 are generated so as to be close to each other in an up-modulation section. On the other hand, a peak $a1d$ corresponding to a frequency difference $f1c$ between the frequency of the transmitted wave TX and that of the received wave RX1 and a peak $b1d$ corresponding to a frequency difference $f1d$ between the frequency of the transmitted wave TX and that of the received wave RX2 are generated so as to be close to each other in a down-modulation section. At this moment, relative velocities and relative distances cannot be calculated accurately unless the spectral peaks in the up-modulation section and those in the down-modulation section are combined (paired) such that the original signals (transmitted wave and received waves) are the same.

To date, spectral peaks having the same amplitudes of frequency components or the same amounts of frequency change have been paired when a plurality of received waves resulting from one transmitted wave are measured as described above. However, correct pairing is difficult by such a method when the amplitudes or the amounts of frequency change are continuously constant as in, for example, waves reflected from median strips or guard rails on roads. Thus, relative velocities or relative distances cannot be accurately calculated.

SUMMARY OF THE INVENTION

Therefore, an object of the present invention is to provide a radar apparatus capable of accurately calculating relative velocities and relative distances even when a plurality of received waves resulting from one transmitted wave are measured.

In order to solve the problems, a radar apparatus according to the present invention includes electromagnetic-wave transmitting/receiving means that transmits a beam of an electromagnetic wave as a transmitted wave and receives a reflected wave generated when the transmitted wave is reflected from a target, the electromagnetic wave including repeated modulation sections in which the frequency is changed in terms of time in a predetermined frequency range; and information detecting means that detects information on the target on the basis of beat signals generated by mixing the transmitted wave and the received wave. The information detecting means includes frequency-spectrum measuring means that measures the frequency spectrum of a first beat signal in a first section in which the frequency of the transmitted wave is changed in terms of time and the frequency spectrum of a second beat signal in a second section in which the inclination of frequency transition in terms of time is the same as that in the first section and following the first section at a predetermined time interval; and state-value detecting means that compares a first peak group including peaks having strengths higher than a predetermined level in the frequency spectrum of the first beat signal with a second peak group including peaks having strengths higher than a predetermined level in the frequency spectrum of the second beat signal, calculates a phase change between a peak included in the first peak group and a peak included in the second peak group, the frequencies of the peaks being substantially the same, and detects the relative velocity and the relative distance of the target corresponding to the peaks using the phase change.

With this structure, the frequency-spectrum measuring means generates beat signals of the transmitted wave repeatedly transmitted at predetermined time intervals in the first section and the second section in which the inclinations of frequency transition in a predetermined time period are the same. When the transmitted wave is, for example, a triangular wave, two adjacent up-modulation sections in terms of time having the same amount of frequency transition in an identical time period are set as the first section and the second section.

The frequency-spectrum measuring means measures the frequency spectrum of each beat signal by performing frequency conversions such as FFTs on the beat signals. The state-value detecting means detects a peak in each of the measured spectra, and calculates a phase change between the peaks.

Herein, the beat signals are composed of terms related to cycles and terms related to phases. More specifically, an intermediate-frequency beat signal (IF beat signal) C(t) can be represented by Expression 1.

$$C(t)=C_0 \cos 2\pi\{2\alpha r_0 t(1-2v/C)+2f_0 vt+2\alpha vt^2(1-v/C)+2r_0(f_0-\alpha r_0/C)\}/C \qquad (1)$$

where $C_0$, $r_0$, v, t, C, and $f_0$ indicate a constant, a distance, a relative velocity, a time, the light velocity, and a central value of a transmission frequency, respectively. $\alpha$ indicates a constant represented by $\alpha=2fm\cdot\Delta F$ when 1/fm is defined as a modulation time width and $\Delta F$ is defined as a frequency transition width (range of the transmission frequency of an FM wave).

In the expression of the IF beat signal, $4\pi r_0(f_0-\alpha r_0/C)/C$ corresponds to a phase term $\phi$. Since $f_0 >> \alpha r_0/C$ is satisfied, $\phi$ can be regarded as follows.

$$\phi \approx 4\pi r_0 f_0/C = 4\pi r_0 \lambda \qquad (2)$$

This indicates that the phase is changed by one cycle ($2\pi$) when the distance $r_0$ is changed by $\lambda/2$.

A relative moving distance can be calculated by detecting the change in phase, i.e., phase change, using this relationship. When the relative moving distance is calculated, a relative velocity is calculated using the time interval between the above-described sections. Furthermore, when the relative velocity is calculated, a Doppler-shift frequency can be calculated such that the position of a target object can be detected.

Moreover, the frequency-spectrum measuring means of the radar apparatus according to the present invention measures the frequency spectrum of a third beat signal in a third section adjacent to the first section or the second section and having the inclination of frequency transition in terms of time opposite that in the first section. The state-value detecting means calculates candidate peaks in the third section using the detected relative velocity and determines degrees of matching between each of the candidate peaks and each peak in a third peak group including peaks having strengths higher than a predetermined level in the frequency spectrum of the third beat signal, selects the best matched peak from the third peak group, and detects the relative velocity and the relative distance of the target corresponding to the peak from the frequency of the peak and the frequency of the peaks with which the phase change is determined.

With this structure, the frequency-spectrum measuring means measures the frequency spectrum of the beat signal in the third section adjacent to the first section or the second section in addition to those in the first section and the second section. Herein, the inclination of frequency transition in terms of time in the third section is opposite those in the first section and the second section. For example, when the transmitted wave is a triangular wave and the first section and the second section are set as described above, a down-modulation section adjacent to an up-modulation section corresponding to the second section is set as the third section. The third section can be set at the down-modulation section subsequent to the second section, at the down-modulation section between the first section and the second section, or at the down-modulation section immediately anterior to the first section.

The state-value detecting means calculates the candidate peaks corresponding to candidate relative velocities in the third section from the frequency spectra of the beat signals in the first section and the second section, compares the candidate peaks with the peaks in the frequency spectrum of the beat signal in the third section generated by the frequency-spectrum measuring means, and determines the degrees of matching. At this moment, a candidate peak that is best matched with one of the measured peaks is selected from the calculated candidate peaks. In this manner, the peak in the third section is determined, and is paired with that in the second section. Subsequently, the relative velocity and the relative distance are calculated using the paired peaks.

Moreover, the frequency-spectrum measuring means of the radar apparatus according to the present invention measures the frequency spectrum of a fourth beat signal in a fourth section preceding the first section by a predetermined time period and having the same inclination of frequency transition in terms of time as that in the first section. The state-value detecting means stores the frequency spectrum of the fourth beat signal in storing means, calculates candidate peaks in the fourth section using the detected relative velocity, determines degrees of matching between each of the candidate peaks and each peak in a fourth peak group including peaks having strengths higher than a predetermined level in the read frequency spectrum of the fourth beat signal, and detects the relative velocity and the relative distance corresponding to the best matched candidate peak.

With this structure, the frequency-spectrum measuring means measures the frequency spectrum of the beat signal in the fourth section preceding the first section or the second section by a predetermined time period in addition to those in the first section and the second section. Herein, the fourth section precedes the first section and the second section, and the inclination of frequency transition in a predetermined time period in the fourth section is the same as those in the first section and the second section.

The state-value detecting means calculates the candidate peaks corresponding to candidate relative velocities in the fourth section from the frequency spectra of the beat signals in the first section and the second section, compares the candidate peaks with the peaks in the fourth section calculated and stored in advance, and determines the degrees of matching. At this moment, a candidate peak that is best matched with one of the candidate peaks based on the fourth section is selected from the candidate peaks based on the first section and the second section as a detected peak. In this manner, the peak in the fourth section is determined, and is paired with that in the first section or the second section. Subsequently, the relative velocity and the relative distance are calculated using the paired peaks.

Moreover, the frequency-spectrum measuring means of the radar apparatus according to the present invention measures the frequency spectrum of a fifth beat signal in a fifth section following the second section at a second time interval that differs from a first time interval between the first section and the second section and having the same inclination of frequency transition in terms of time as that in the first section. The state-value detecting means calculates first candidate relative velocities of the target from the detected relative velocity; compares the second peak group with a fifth peak group including peaks having strengths higher than a predetermined level in the frequency spectrum of the fifth beat signal, calculates a phase change between a peak included in the second peak group and a peak included in the fifth peak group, the frequencies of the peaks being substantially the same, and calculates second candidate relative velocities of the target corresponding to the peaks from the phase change; and determines degrees of matching between the first candidate relative velocities and the second candidate relative velocities, detects the best matched candidate relative velocity as a true relative velocity, and detects the relative distance by determining a phase change from the relative velocity.

With this structure, the frequency-spectrum measuring means measures the frequency spectrum of the beat signal in the fifth section following the first section and the second section in addition to those in the first section and the second section. Herein, the fifth section follows the second section at a time interval that differs from the time interval between the first section and the second section.

The state-value detecting means calculates the first candidate relative velocities from the peaks of the beat signals in the first section and the second section, and calculates the second candidate relative velocities from the peaks of the beat signals in the second section and the fifth section. The state-value detecting means determines the degrees of matching between the first candidate relative velocities and the second candidate relative velocities, and detects the best matched candidate relative velocity as a required relative velocity. Subsequently, the relative distance and the position are calculated from the phase change obtained from the relative velocity.

Moreover, in the radar apparatus according to the present invention, the time difference dT between the first time interval and the second time interval is set using the following expression:

$$dT < \lambda/(2|Vmax - Vmin|)$$

where Vmax, Vmin, and $\lambda$ indicate a possible maximum relative velocity of the reflective object, a possible minimum relative velocity, and the wavelength of the transmitted wave, respectively.

With this structure, setting the difference between the time intervals that differ from each other as described above using the above-described expression leads only one pair of the first candidate relative velocities and the second candidate relative velocities having the minimum state difference.

The radar apparatus according to the present invention further includes scanning means that successively scans beams of the transmitted wave in azimuthal directions, and detects the phase changes between two adjacent transmitted beams scanned by the scanning means.

With this structure, required peaks can be measured without measuring in the same azimuth a plurality of times by setting the spacing between two adjacent scanned transmitted beams such that the beams are incident on an identical target object and applying the first section and the second section to the corresponding transmitted beams. With this, the phase changes and peaks adjacent to each other in the scanning direction can be measured at the same time.

According to the present invention, the relative moving distance of a target object, the relative velocity of the target object with respect to an automobile equipped with a radar apparatus according to the present invention, and the position of the target object can be accurately calculated by calculating a phase change between peaks of beat signals in sections in which the inclinations of frequency spectrum in terms of time are the same.

Moreover, according to the present invention, candidate relative velocities based on the phase change can be used. With this, the relative velocity of the target object with respect to the automobile and the relative distance between the automobile and the target object can be accurately calculated.

Moreover, according to the present invention, the relative velocity of the target object with respect to the automobile and the relative distance between the automobile and the target object can be accurately calculated by calculating candidate relative velocities between a plurality of sections on the basis of the phase changes and determining the relative velocity by determining degrees of matching between the candidate relative velocities without pairing. Furthermore, according to the present invention, the relative velocity can be easily calculated by setting differences between repetition periods of the sections to a predetermined value when the candidate relative velocities between the plurality of sections are calculated.

Moreover, according to the present invention, the phase changes and peaks in azimuthal directions can be measured at the same time in a radar apparatus having a scanning function. With this, the relative velocity of the target object with respect to the automobile and the relative distance between the automobile and the target object can be accurately measured during scanning.

BRIEF DESCRIPTION OF THE DRAWINGS

FIGS. 4(A) to 4(E) illustrate another method, different from that shown in FIGS. 2(A) to 3, for calculating relative velocities and relative distances.

FIG. 10(A) illustrates waveforms of a transmitted wave and received waves when a plurality of received waves are measured for one transmitted wave, FIG. 10(B) illustrates a spectrum in an up-modulation section, and FIG. 10(C) illustrates a spectrum in a down-modulation section.

REFERENCE NUMERALS

101—first section, 201—second section, 301—third section, 401—fourth section, 501—fifth section, 1—controller, 2—VCO, 3—transmitting amplifier, 4—coupler, 5—circulator, 6—antenna, 7—mixer, 8—receiving amplifier, 9—A/D converter, 10—data processor

DETAILED DESCRIPTION OF THE INVENTION

An FM-CW radar apparatus according to a first embodiment of the present invention will now be described with reference to the drawings.

Figure 1:
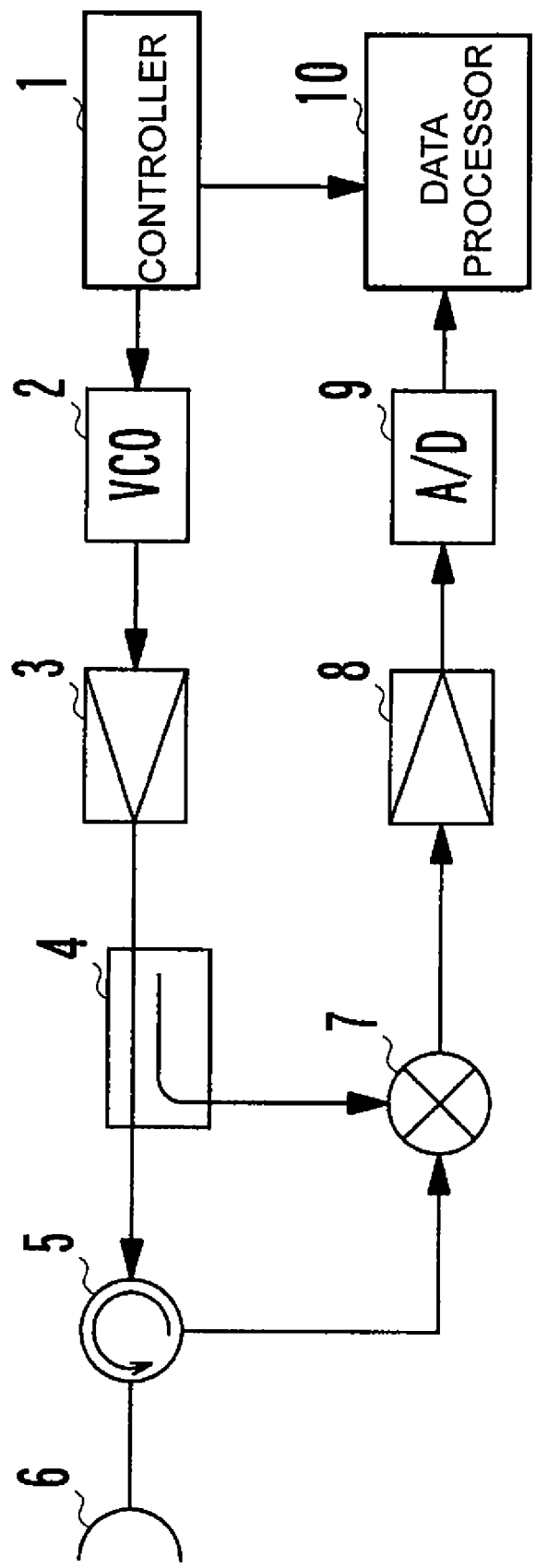
FIG. 1 is a schematic block diagram illustrating the structure of an FM-CW radar apparatus according to a first embodiment.

FIG. 1 is a schematic block diagram illustrating the structure of the FM-CW radar apparatus according to this embodiment.

FIG. 2(A) illustrates waveforms of a transmitted wave and received waves of the FM-CW radar apparatus shown in FIG. 1, FIG. 2(B) illustrates a spectrum of an IF beat signal in a first section, and FIG. 2(C) illustrates a spectrum of an IF beat signal in a second section. FIGS. 2(A) to 2(C) illustrate a case when target objects approach an automobile equipped with the radar apparatus.

A controller 1 of the FM-CW radar apparatus generates a modulation control signal for forming a transmitted wave Tx whose frequency is changed so as to form a triangular wave as shown in FIG. 2(A), and outputs the signal to a VCO 2. At this moment, the controller 1 generates the modulation control signal such that modulation sections having a triangular waveform are formed at predetermined time intervals.

The VCO 2 changes the oscillating frequency in accordance with the input modulation control signal. With this, the VCO 2 generates a transmitted signal Tx whose oscillatory frequency is changed so as to form a triangular wave and whose modulation sections are repeated at predetermined time intervals. More specifically, for example, the transmitted signal TX having a central frequency $f_o$, a modulation cycle $1/f_m$, a frequency transition width (difference between the maximum frequency and the minimum frequency of the modulation frequency) $\Delta F$, and a time interval To as shown in FIGS. 2(A) to 2(C) is generated.

A transmitting amplifier 3 amplifies the transmitted signal TX generated by the VCO 2. A coupler 4 transmits the transmitted wave Tx to a circulator 5, and at the same time, provides a part of the transmitted signal TX in a predetermined distribution ratio to a mixer 7 as a local signal. The circulator 5 transmits the transmitted signal TX to an antenna 6, and transmits a received signal RX received by the antenna 6 to the mixer 7. The antenna 6 converts the input transmitted signal TX into an electromagnetic wave (transmitted wave), and sends the electromagnetic wave to the exterior. The antenna 6 receives a reflected wave in the same direction generated by reflection of the transmitted wave from a target object, and outputs the received signal RX to the circulator 5.

The mixer 7 mixes the received signal RX input by the circulator 5 and the local signal based on the transmitted signal TX input by the coupler 4 and generates an IF beat signal with predetermined frequencies. A receiving amplifier 8 amplifies the IF beat signal, and outputs the signal to an A/D converter 9. The A/D converter 9 converts the analog IF beat signal into a digital IF beat signal, and outputs the signal to a data processor 10.

The data processor 10 generates a frequency spectrum by performing an FFT on the input digital IF beat signal. Subsequently, the data processor 10 detects peak frequencies (in bins) from the frequency spectrum using a below-mentioned method, and calculates the relative velocity of the target object with respect to the automobile, the relative distance between the automobile and the target object, and the relative position of the target object with respect to the automobile. The data processor 10 corresponds to "information detecting means" of the present invention, and the "information detecting means" includes "frequency-spectrum measuring means" and "state-value detecting means".

Next, a method for calculating relative velocities and relative distances employed in the data processor 10 will be specifically described. In the description below, two received signals RX1 and RX2 are measured for one transmitted signal TX.

When the transmitted wave output from the antenna 6 is reflected by a target object, a reflected wave is generated and received by the antenna 6. At this moment, when a plurality of target objects that reflect the transmitted wave exist, the antenna 6 receives a plurality of reflected waves.

Figure 3:
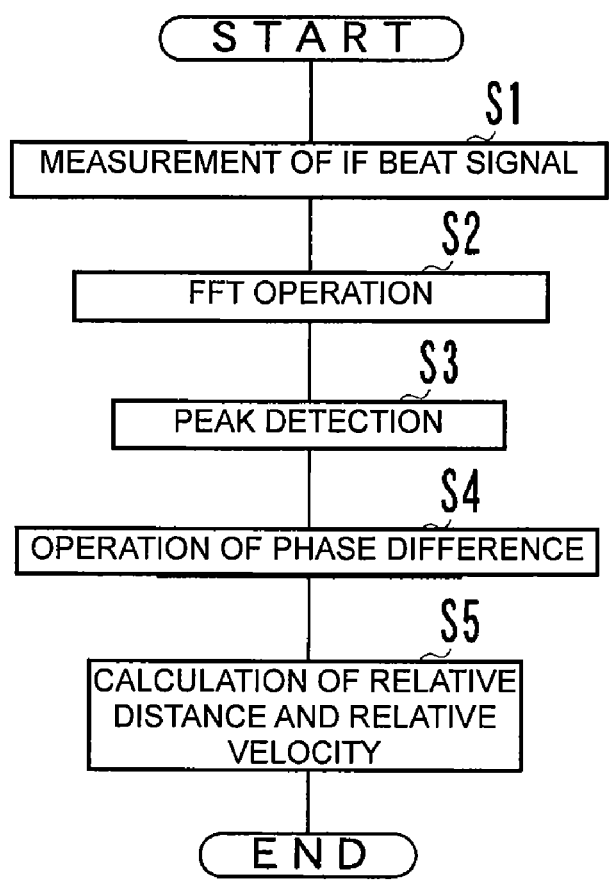
FIG. 3 is a flow chart illustrating a flow of calculating relative velocities and relative distances in the first embodiment.

FIG. 3 is a flow chart illustrating a flow of calculating relative velocities and relative distances in this embodiment.

When two target objects exist in a direction along which the transmitted wave is output, two received signals RX1 and RX2 resulting from one transmitted signal TX are measured. At this moment, the received signals RX1 and RX2 are delayed from the transmitted signal TX in accordance with the distances between the automobile and the target objects, and the measured frequencies of the received signals RX1 and RX2 differ from the frequency of the transmitted signal TX in accordance with the relative velocities between the automobile and the target objects.

In the example shown in FIGS. 2(A) to 2(C), the frequency bands of the received signals RX1 and RX2 are higher than that of the transmitted signal TX since the target objects approach the automobile.

In a first section 101 and a second section 201 serving as up-modulation sections adjacent to each other in terms of time, IF beat signals are generated by the mixer 7 using the transmitted signal TX and the received signals RX1 and RX2 (S1). Herein, the IF beat signal in the first section 101 is defined as a first beat signal, and that in the second section 201 is defined as a second beat signal. Moreover, the lengths of the first section 101 and the second section 201 are the same in terms of time, and the inclinations of frequency transition in terms of time in these sections are also the same. Moreover, the frequencies are desirably changed in a linear manner in terms of time. The same applies to other embodiments.

The first beat signal includes a frequency difference component f1a between the transmitted signal TX and the received signal RX1 and a frequency difference component f1b between the transmitted signal TX and the received signal RX2 in the first section 101. Accordingly, a frequency spectrum including a peak frequency a1 corresponding to the frequency difference component f1a and a peak frequency b1 corresponding to the frequency difference component f1b can be obtained when the data processor 10 performs a frequency conversion such as an FFT on the first beat signal (S2). On the other hand, the second beat signal includes a frequency difference component f2a between the transmitted signal TX and the received signal RX1 and a frequency difference component f2b between the transmitted signal TX and the received signal RX2 in the second section 201. Accordingly, a frequency spectrum including a peak frequency a2 corresponding to the frequency difference component f2a and a peak frequency b2 corresponding to the frequency difference component f2b can be obtained when the data processor 10 performs a frequency conversion such as an FFT on the second beat signal (S2). Herein, the peak frequencies a1, a2, b1, and b2 are shown in bins of the FFT, and correspond to bin numbers of a data sequence after the FFT. Herein, a "bin" corresponds to a minimum frequency increment after a frequency conversion set in accordance with the number of points in an FFT and a measuring time.

Next, the data processor 10 detects peak frequencies from the frequency spectra. The peak frequencies are detected by, for example, setting predetermined thresholds to signal strengths P1 and P2 of the spectra, and detecting frequency components having signal strengths higher than the thresholds as peak frequencies (S3). In the example shown in FIGS. 2(A) to 2(C), the peak frequencies a1 and b1 are detected in the first section 101, and the peak frequencies a2 and b2 are detected in the second section 201.

When the data processor 10 detects the peak frequencies a1 and b1 in the first section 101 and the peak frequencies a2 and b2 in the second section 201, phase differences φ between the peak frequencies a1 and a2 and between the peak frequencies b1 and b2 are detected (S4).

The repetition interval between the first section 101 and the second section 201, i.e., the time interval To between the modulation sections, is set on the basis of the following expression using a distance resolution δR of the radar apparatus and a possible maximum velocity Vmax of the target objects.

$$To < \delta R/V\max$$

The distance resolution δR can be represented by the following expression using the light velocity C and the frequency transition width ΔF of the transmitted signal TX.

$$\delta R = C/(2\Delta F)$$

Thus, the time interval To between the modulation sections is set as follows.

$$To < C/(2\Delta F \cdot V\max)$$

When the time interval To is set by using the distance resolution δR and the maximum velocity Vmax in this manner, the peak frequencies in the second section 201 appear within the range of ±1 bins, i.e., within three bins with respect to the peak frequencies in the first section 101, the peak frequencies corresponding to the same target objects, as a result of performing FFTs on the IF beat signals. In FIGS. 2(A) to 2(C), the peak frequency a2 in the second section 201 appears within the range of ±1 bins with respect to the peak frequency a1 in the first section 101, and the peak frequency b2 in the second section 201 appears within the range of ±1 bins with respect to the peak frequency b1 in the first section 101. Through the use of this, the peak frequency a1 is paired with the peak frequency a2, and the peak frequency b1 is paired with the peak frequency b2 so that the phase differences thereof are calculated. In this manner, the peak frequencies in the first section and those in the second section corresponding to the same target objects can be easily paired by setting the time interval To as described above.

When the phase differences φ are detected while the time interval To is set as described above, relative moving distances Δr of the target objects can be calculated from the following expression on the basis of the above-described Expressions (1) and (2).

$$\Delta r = (i + \phi/(2\pi)) \cdot \lambda/2$$

Herein, when the relative moving distances Δr are sufficiently small, that is, when the relative velocities of the target objects are sufficiently small and the relative moving distances Δr are smaller than λ/2, i=0 is satisfied, and the relative moving distances Δr can be calculated from the following expression.

$$\Delta r = (\phi/(2\pi)) \cdot \lambda/2$$

When the relative moving distances Δr of the target objects are calculated, relative velocities Vr of the target objects can be calculated from the following expression (S5).

$$Vr = \Delta r/To$$

The relative velocities and the relative distances can also be calculated using a method described below.

Figure 2:
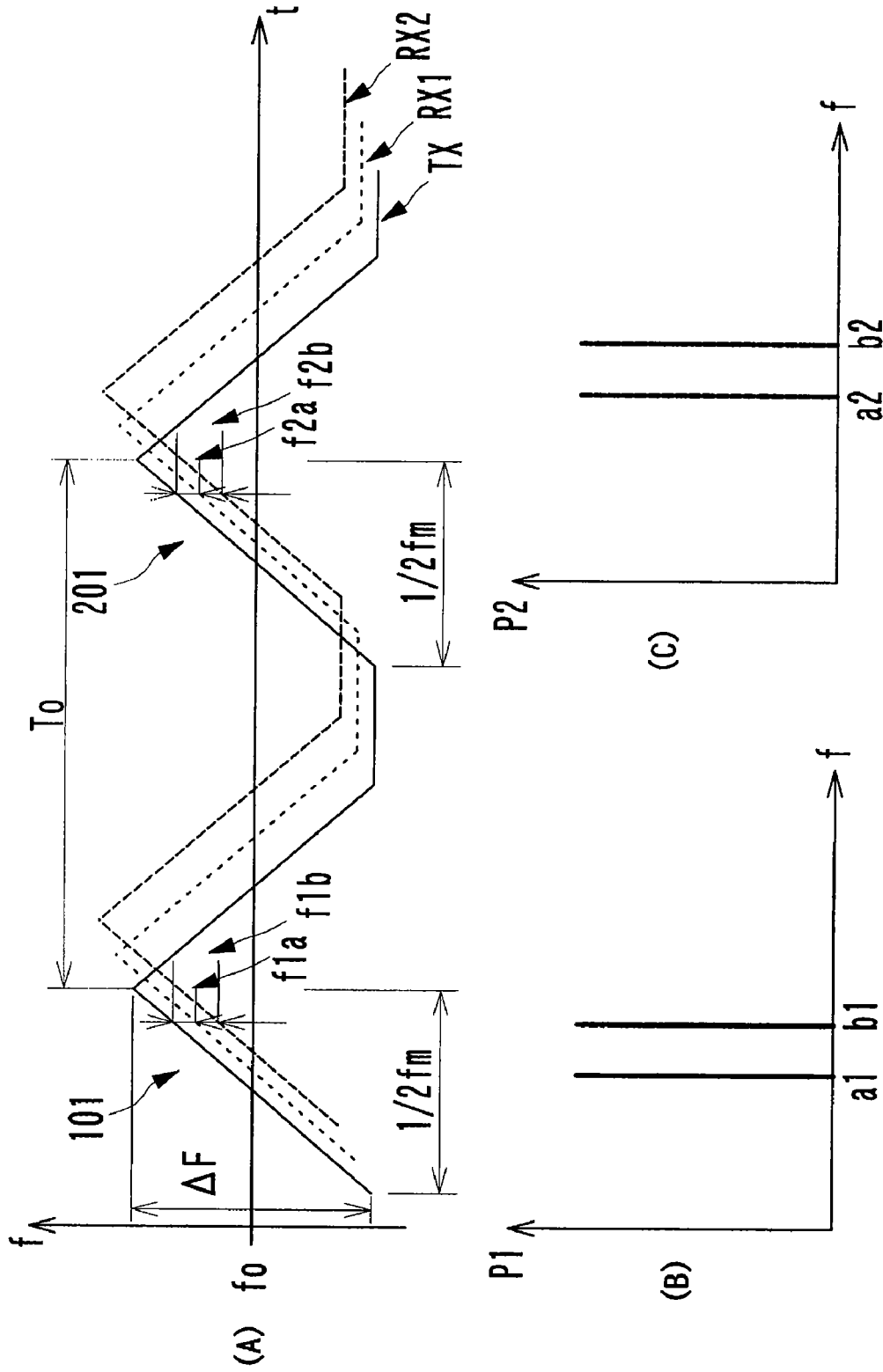
FIG. 2(A) illustrates waveforms of a transmitted wave and received waves of the FM-CW radar apparatus shown in FIG. 1.
FIG. 2(B) illustrates a spectrum of an IF beat signal in a first section.
FIG. 2(C) illustrates a spectrum of an IF beat signal in a second section.

FIGS. 4(A) to 4(E) illustrate another method, different from that shown in FIGS. 2(A) to 3, for calculating relative velocities and relative distances. FIG. 4(A) illustrates waveforms of a transmitted signal TX and a received signal RX1, FIG. 4(B) illustrates a frequency spectrum in a first section 101, FIG. 4(C) illustrates a frequency spectrum in a second section 201, FIG. 4(D) illustrates a frequency spectrum in a third section 301 subsequent to the second section 201, and FIG. 4(E) illustrates candidate peaks that can be generated in the third section 301. In the description below, only one received signal RX1 is resulting from one transmitted signal TX. However, the following method can be applied to the case where a plurality of received signals RX are obtained.

Figure 5:
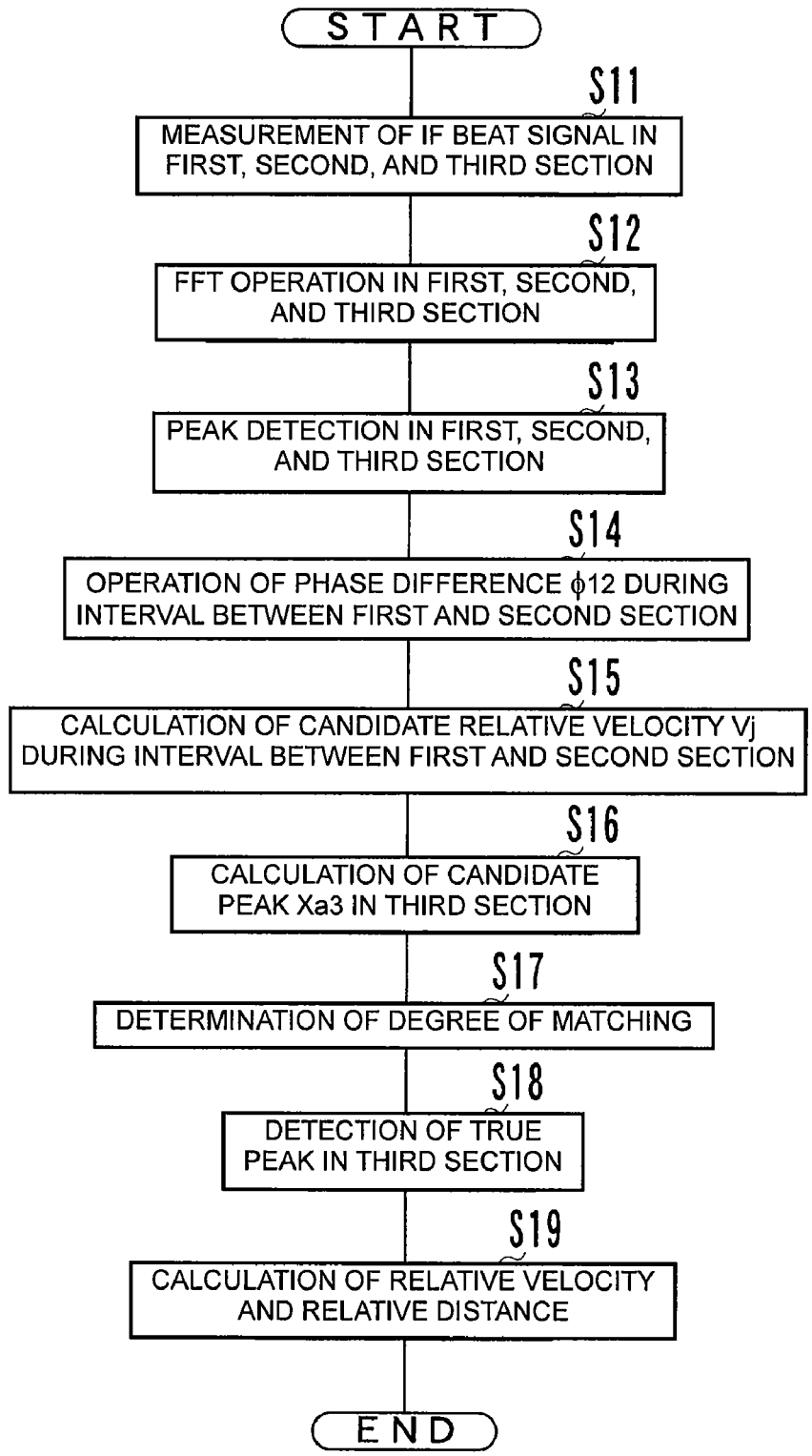
FIG. 5 is a flow chart using the calculation method shown in FIGS. 4(A) to 4(E).

FIG. 5 is a flow chart using the calculation method shown in FIGS. 4(A) to 4(E).

In the above-described method, the relative moving distances Δr are smaller than λ/2. In this method, the relative moving distance Δr during the time interval To is larger than or equal to λ/2 since, for example, the relative velocity of the target object is large.

In this case, the mixer 7 generates IF beat signals in the first section 101 and the second section 201 serving as up-modulation sections that are adjacent to each other, and also generates an IF beat signal in the third section 301 serving as a down-modulation section subsequent to the second section 201 (S11). In this third section 301, the direction of frequency transition in terms of time is opposite those in the first section 101 and second section 201, and the inclination of frequency transition is the same as those in the first section 101 and second section 201. Herein, the third section 301 follows the second section 201. However, any down-modulation section, for example, that precedes the first section 101, that between the first section 101 and the second section 201, or that follows the second section 201 can be defined as the third section 301. Moreover, the third section 301 is not necessarily continued from the first section 101 or the second section 201, and can be defined at a position separated by a predetermined time interval. Furthermore, the absolute value of the inclination of frequency transition in terms of time and the amount of frequency transition in the third section 301 can differ from those in the first section 101.

For example, when the transmitted signal TX and the received signal RX1 as shown in FIG. 4(A) are obtained, IF beat signals in the first section 101, in the second section 201, and in the third section 301 can be obtained on the basis of the transmitted and received signals.

The data processor 10 performs FFTs on these IF beat signals, and calculates the frequency spectra (S12). In the example shown in FIGS. 4(A) to 4(E), a frequency spectrum as shown in FIG. 4(B) is obtained in the first section 101, a frequency spectrum as shown in FIG. 4(C) is obtained in the second section 201, and a frequency spectrum as shown in FIG. 4(D) is obtained in the third section 301.

Next, the data processor 10 detects peaks from the frequency spectra (S13). In the example shown in FIGS. 4(A) to 4(E), a peak frequency a2 is detected in the second section 201 (FIG. 4(C)), and peak frequencies a3 and c3 are detected in the third section 301 (FIG. 4(D)). Moreover, the data processor 10 detects a peak frequency a1 in the first section 101 corresponding to the peak frequency a2 in the second section 201 (FIG. 4(B)).

When the peak frequencies in each of the sections are detected in this manner, the data processor 10 calculates a phase difference φ12 during the interval between the first section 101 and the second section 201 using the peak frequency a1 in the first section 101 and the peak frequency a2 in the second section 201 (S14).

Next, the data processor 10 calculates candidate relative velocities Vj during the interval between the first section 101 and the second section 201 from the following expression using the relative velocity of the target object (S15).

$$Vj = \Delta r/To = (j + \phi 12/(2\pi)) \cdot \lambda/(2To)$$

Herein, j is an integer that satisfies $-n \leq j \leq m$ when n and m are defined as integers set in accordance with a range of possible relative velocities of the target object.

After the data processor 10 calculates the candidate relative velocities Vj during the interval between the first section 101 and the second section 201, the data processor 10 calculates candidate peaks Xa3 in the third section 301 from the following expression (S16).

$$Xa3 = a2 + Vj/\delta V$$

Herein, $\delta V$ indicates a velocity resolution of a detecting speed determined by detecting a Doppler shift, and corresponds to the width of one bin of the FFT results.

With this calculation, the candidate peaks Xa3, which correspond to each j, are calculated. For example, in the example of FIG. 4(E), the candidate relative velocities Vj are calculated under a condition of n=2 and m=2, and five candidate peaks Xa3 ranging from Xa3(−2) to Xa3(+2) are calculated. These candidate peaks Xa3 are also obtained at each bin.

The data processor 10 compares the calculated candidate peaks Xa3 with the peak frequencies a3 and c3 obtained from the frequency spectrum, and determines degrees of matching. That is, it is determined how well the candidate peaks Xa3 are matched with the measured peak frequencies a3 and c3 (S17). Factors for determining the degrees of matching include, for example, degrees of coincidence in positions of frequencies and degrees of coincidence in strengths (amplitudes). Moreover, degrees of coincidence between absolute values of the phase difference used for determining the candidate peaks Xa3 and phase differences between the peaks extracted in the third section 301 and those extracted in a section, separated from the third section by the same time interval as that between the first section 101 and the second section 201 and having the same inclination of frequency transition in terms of time as that in the third section 301, can be used as a factor for determining the degrees of matching. These determination factors can be used independently, or can be used in combination.

The data processor 10 determines a combination in which the measured peak frequency a3 or c3 best matches with one of the candidate peaks Xa3, i.e., the best matched combination, and extracts the peak frequency as a true peak frequency in the third section 301. In the example shown in FIGS. 4(A) to 4(E), a combination of the measured peak frequency a3 and one of the candidate peaks Xa3 is extracted, and the peak frequency is determined as a true peak frequency (S18).

Since the peak frequency a2 in the up-modulation section and the peak frequency a3 in the down-modulation section subsequent to the up-modulation section are determined through these processes, the relative velocity, the relative distance, and the position of the target object can be calculated from the known FM-CW principle by pairing the peak frequencies (S19). More specifically, a frequency change fr caused by a range delay and a frequency change fd caused by a Doppler shift are calculated from the peak frequency (beat frequency) a2 in the up-modulation section and the peak frequency (beat frequency) a3 in the down-modulation section.

$$fr = (a2 + a3)/2$$

$$fd = (a2 - a3)/2$$

Subsequently, a relative distance R and a relative velocity V are calculated from these expressions.

$$R = (C/(4\Delta F fm)) \cdot fr$$

$$V = (C/(2fo)) \cdot fd$$

The peak in the up-modulation section and that in the down-modulation section subsequent to the up-modulation section can be correctly paired through these processes. With this, an FM-CW radar apparatus capable of accurately calculating relative velocities and relative distances can be achieved.

According to this embodiment, the relative velocities and the relative distances of the target objects can be easily and accurately calculated from the phase differences between the peak frequencies in the plurality of sections having the same amounts of frequency transition in terms of time and measured at predetermined time intervals as described above.

Next, a radar apparatus according to a second embodiment will be described with reference to the drawings.

Figure 6:
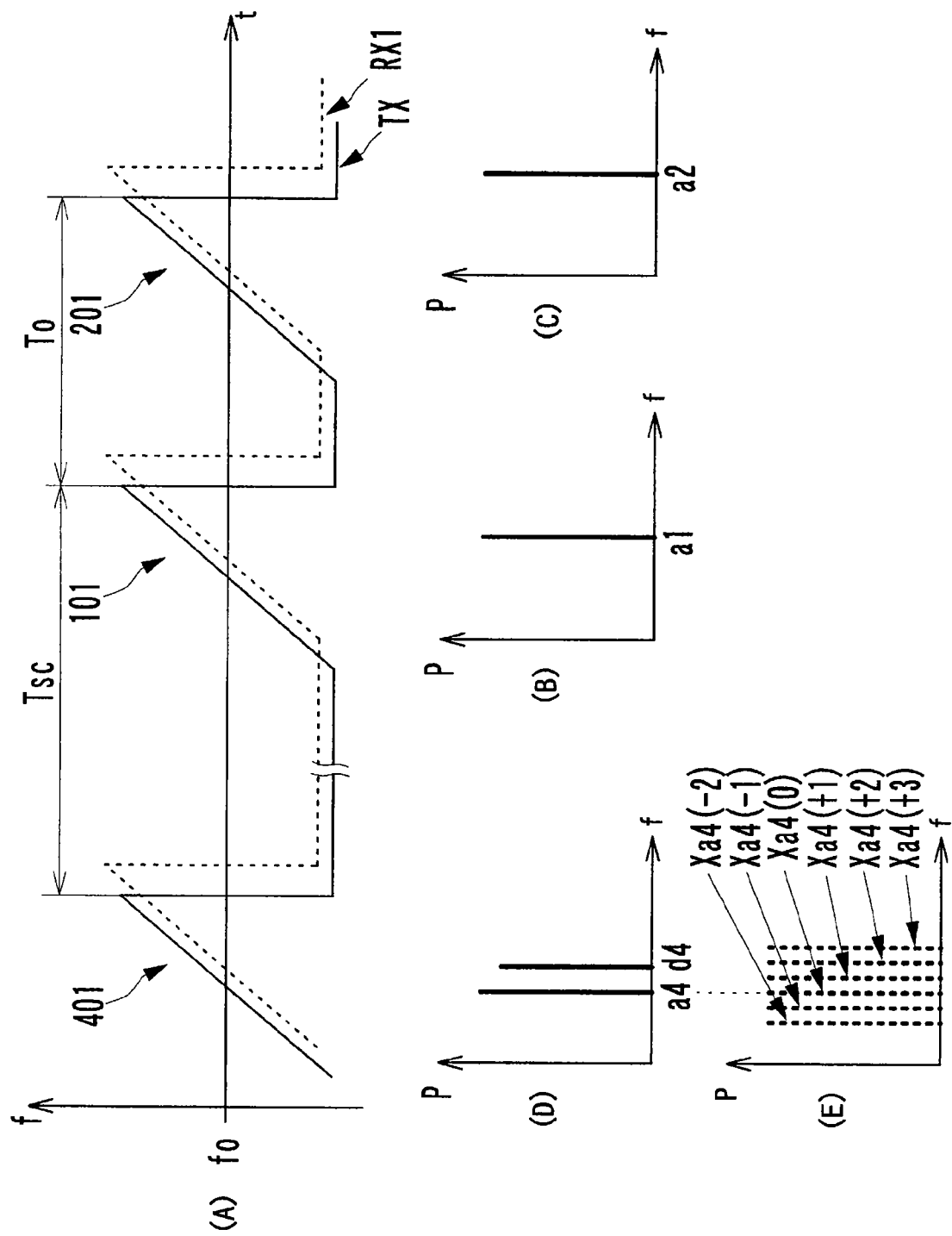
FIGS. 6(A) to 6(E) illustrate another method, different from the above-described methods shown in the first embodiment, for calculating relative velocities and relative distances.

FIGS. 6(A) to 6(E) illustrate another method, different from the above-described methods, for calculating relative velocities and relative distances. FIG. 6(A) illustrates waveforms of a transmitted signal TX and a received signal RX1, FIG. 6(B) illustrates a frequency spectrum in a first section 101, FIG. 6(C) illustrates a frequency spectrum in a second section 201, FIG. 6(D) illustrates a frequency spectrum in a fourth section 401 preceding the first section 101 by one measurement cycle Tsc, and FIG. 6(E) illustrates candidate peaks that can be generated in the fourth section 401. In this embodiment, a transmitted signal whose frequency is changed so as to form a sawtooth wave, that is, a transmitted signal having successive up-modulation sections in which the frequency is gradually increased in terms of time is used instead of the transmitted signal whose frequency is changed so as to form a triangular wave. The same results can also be achieved when the transmitted signal has successive down-modulation sections in which the frequency is gradually reduced in terms of time. In the description below, only one received signal RX1 is resulting from one transmitted signal TX. However, the following method can be applied to the case where a plurality of received signals RX are obtained. Moreover, the fourth section 401 is a section in which the inclination of frequency transition in terms of time in a specific time period is the same as those in the first section 101 and the second section 201.

Figure 7:
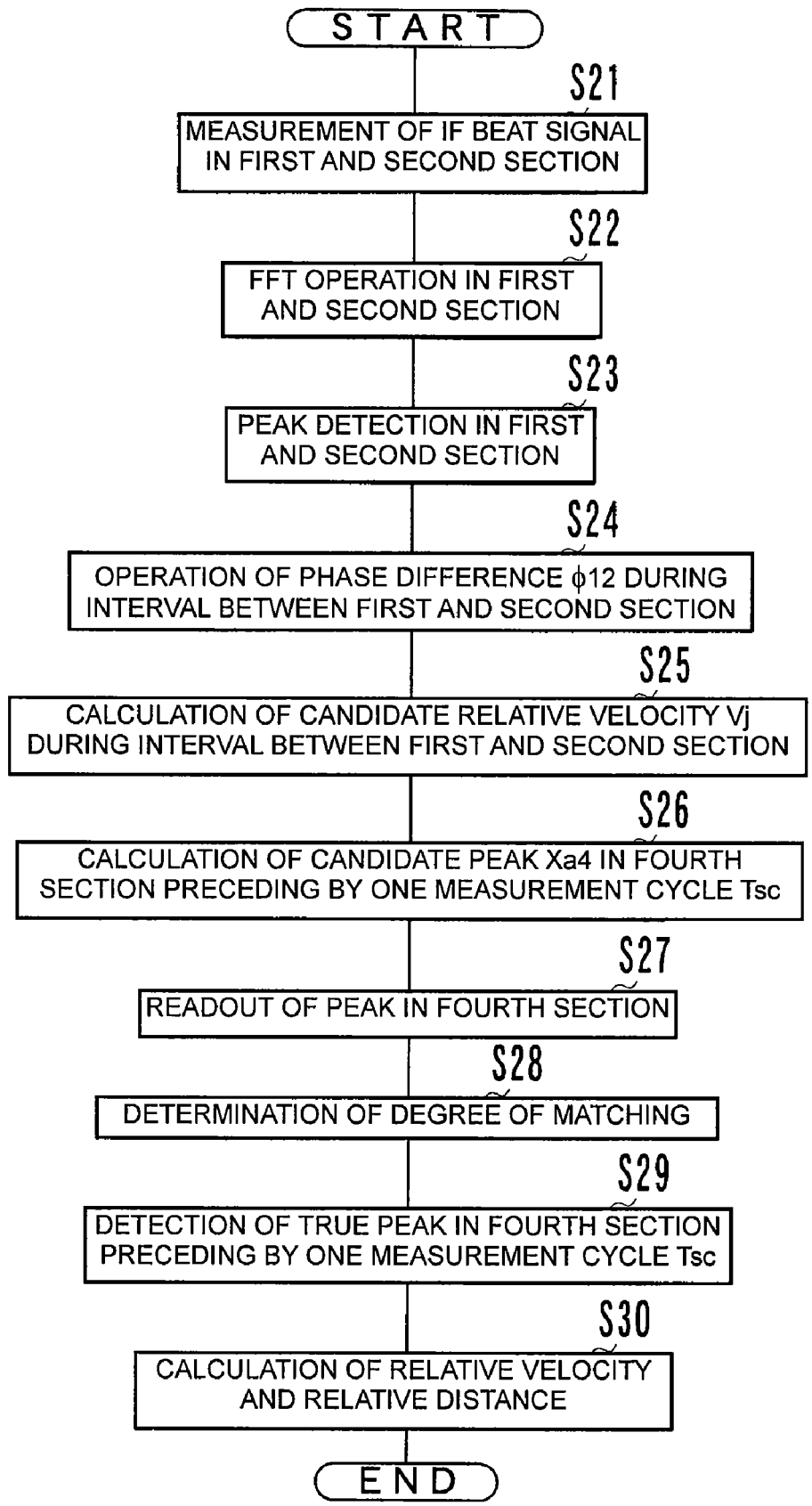
FIG. 7 is a flow chart using the calculation method according to a second embodiment shown in FIGS. 6(A) to 6(E).

FIG. 7 is a flow chart using the calculation method shown in FIGS. 6(A) to 6(E).

A mixer 7 generates IF beat signals in the first section 101 and the second section 201 serving as up-modulation sections adjacent to each other at a time interval To (S21). For example, when the transmitted signal TX and the received signal RX1 as shown in FIG. 6(A) are obtained, the IF beat signals in the first section 101 and in the second section 201 can be obtained.

A data processor 10 performs FFTs on the measured IF beat signals, and calculates the frequency spectra (S22). In the example shown in FIGS. 6(A) to 6(E), a frequency spectrum as shown in FIG. 6(B) can be obtained in the first section 101, and a frequency spectrum as shown in FIG. 6(C) can be obtained in the second section 201.

Next, the data processor 10 detects peaks from the frequency spectra (S23). In the example shown in FIGS. 6(A) to 6(E), peak frequencies a1 and a2 are detected in the first section 101 and the second section 201, respectively (FIGS. 6(B) and 6(C)).

At this moment, an IF beat signal is also measured in the fourth section 401 preceding the measurement of the IF beat signal in the first section 101 by the predetermined measurement cycle Tsc. This measurement cycle Tsc corresponds to, for example, one scanning cycle when the radar apparatus has a scanning function. With this, the azimuthal directions in the first section 101 and the fourth section 401 become the same, and an identical target object is observed at the measurement cycle Tsc. The data processor 10 performs an FFT on the measured IF beat signal in the fourth section 401, calculates the frequency spectrum, and detects peaks from the frequency spectrum. In the example shown in FIGS. 6(A) to 6(E), a frequency spectrum as shown in FIG. 6(D) is obtained, and peak frequencies a4 and d4 are detected. The data processor 10 stores the information on these peak frequencies in a memory.

When the peak frequencies are detected in the first section 101 and the second section 201, the data processor 10 calculates a phase difference $\phi 12$ during the interval between the first section 101 and the second section 201 using the peak frequencies a1 and a2 (S24).

Next, the data processor 10 calculates candidate relative velocities Vj during the interval between the first section 101 and the second section 201 from the following expression using the relative velocity of the target object (S25).

$$Vj=\Delta r/To=(j+\phi12/(2\pi))\cdot\lambda/(2To)$$

Herein, j is an integer that satisfies $-n \leq j \leq m$ when n and m are defined as integers set in accordance with a range of possible relative velocities of the target object.

After the data processor 10 calculates the candidate relative velocities Vj during the interval between the first section 101 and the second section 201, the data processor 10 calculates candidate peaks Xa4 in the fourth section 401 from the following expression (S26).

$$Xa4=a1-Vj/(\delta R/Tsc)=a1-Vj\cdot Tsc/\delta R$$

Herein, $\delta R$ indicates the above-described distance resolution, and corresponds to the width of one bin of the FFT results.

With this calculation, the candidate peaks Xa4, which correspond to each j, are calculated. For example, in the example of FIG. 6(E), the candidate relative velocities Vj are calculated under a condition of n=2 and m=3, and six candidate peaks Xa4 ranging from Xa4(−2) to Xa3(+3) are calculated.

The data processor 10 reads out the information on the peak frequencies in the fourth section 401 (S27), compares the calculated candidate peaks Xa4 with the peak frequencies a4 and d4 obtained from the frequency spectrum, and determines degrees of matching. That is, it is determined how well the candidate peaks Xa4 are matched with the measured peak frequencies a4 and d4 (S28). Factors for determining the degrees of matching include, for example, degrees of coincidence in positions of frequencies and degrees of coincidence in strengths (amplitudes). Moreover, degrees of coincidence between absolute values of the phase difference used for determining the candidate peaks Xa4 and phase differences between the peaks extracted in the fourth section 401 and those extracted in a section, separated from the fourth section by the same time interval as that between the first section 101 and the second section 201 and having the same inclination of frequency transition in terms of time as that in the fourth section 401, and the rotational directions of the phase differences can be used as factors for determining the degrees of matching. Moreover, when the fourth section 401 precedes the first section 101 by one scanning cycle as in this embodiment, directions along which the peaks are detected can be used as a factor for determining the degrees of matching. These determination factors can be used independently, or can be used in combination.

The data processor 10 determines a combination in which the measured peak frequency a4 or d4 best matches with one of the candidate peaks Xa4, i.e., the best matched combination, and extracts the peak frequency as a true peak frequency in the fourth section 401. In the example shown in FIGS. 6(A) to 6(E), a combination of the measured peak frequency a4 and one of the candidate peaks Xa4 is extracted, and the peak frequency is determined as a true peak frequency (S29).

The relative velocity and the relative distance can be calculated through these processes (S30). In this example, the fourth section 401 precedes the first section 101 by one scanning cycle. However, the fourth section 401 does not necessarily precede the first section 101 by one scanning cycle. Furthermore, the absolute value of the inclination of frequency transition in terms of time and the amount of frequency transition in the fourth section 401 can differ from those in the first section 101.

Next, a radar apparatus according to a third embodiment will be described with reference to the drawings.

Figure 8:
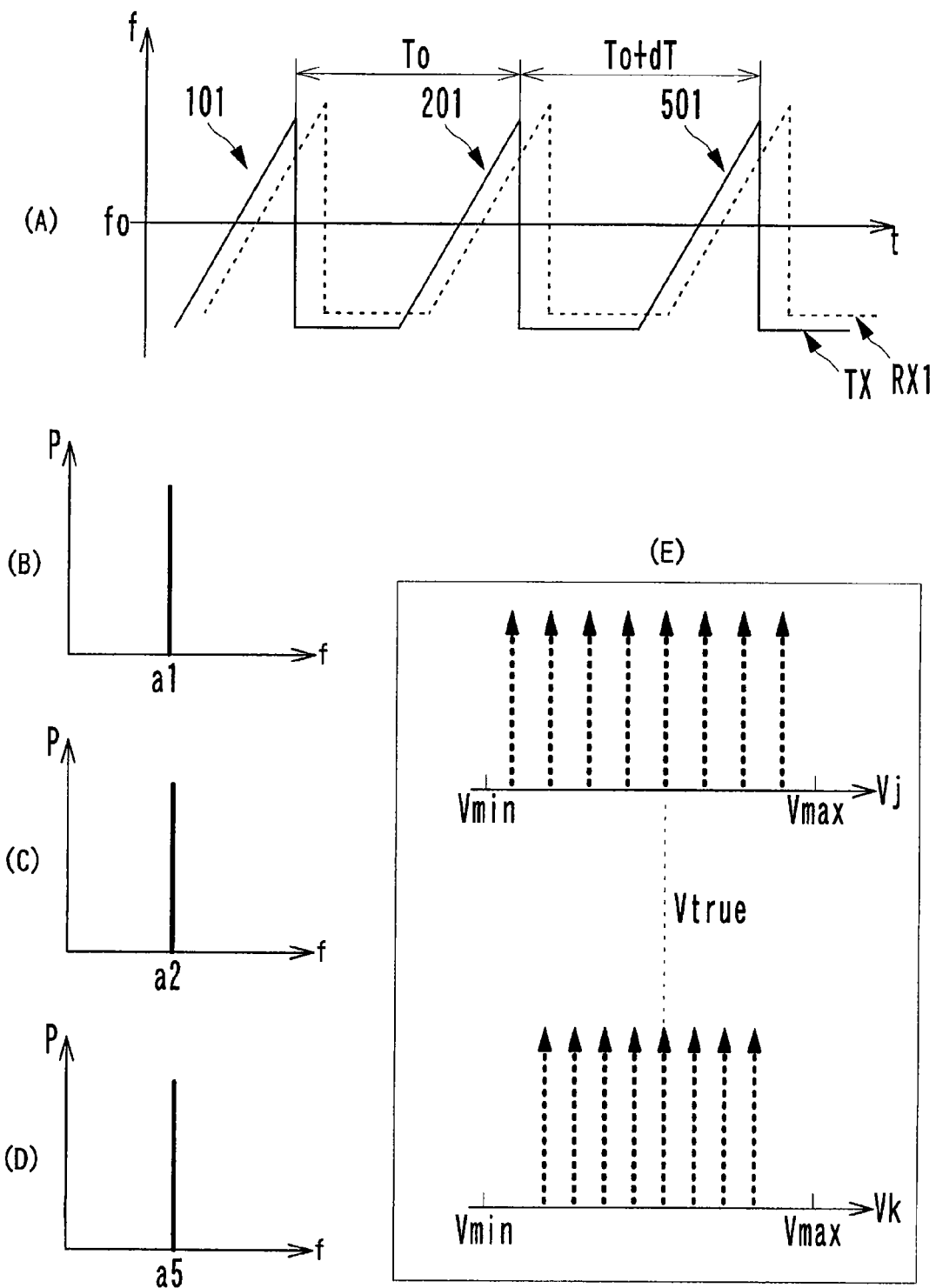
FIGS. 8(A) to 8(E) illustrate another method, different from the above-described methods shown in the first and second embodiments, for calculating relative velocities and relative distances.

FIGS. 8(A) to 8(E) illustrate another method, different from the above-described methods, for calculating relative velocities and relative distances. FIG. 8(A) illustrates waveforms of a transmitted signal TX and a received signal RX1, FIG. 8(B) illustrates a frequency spectrum in a first section 101, FIG. 8(C) illustrates a frequency spectrum in a second section 201, FIG. 8(D) illustrates a frequency spectrum in a fifth section 501, and FIG. 8(E) illustrates candidate velocities Vj during the interval between the first section 101 and the second section 201 and candidate velocities Vk during the interval between the second section 201 and the fifth section 501. A transmitted signal whose frequency is changed so as to form a sawtooth wave, that is, a transmitted signal having successive up-modulation sections in which the frequency is gradually increased in terms of time is also used in this embodiment. The same results can also be achieved when the transmitted signal has successive down-modulation sections in which the frequency is gradually reduced in terms of time. In the description below, only one received signal RX1 is measured for one transmitted signal TX. However, the following method can be applied to the case where a plurality of received signals RX are obtained. Moreover, the fifth section 501 is a section in which the inclination of frequency transition in terms of time in a specific time period is the same as those in the first section 101 and the second section 201.

Figure 9:
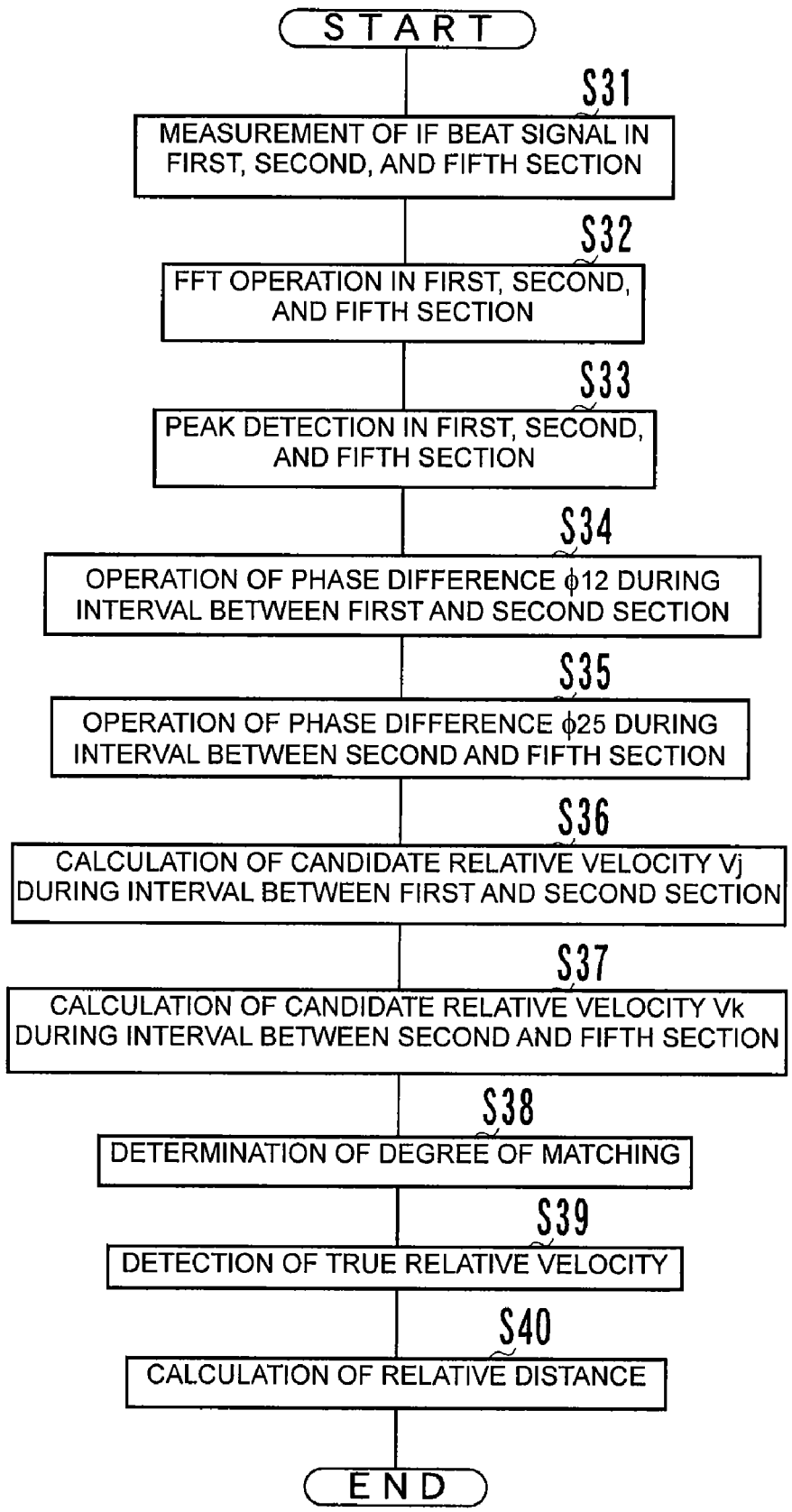
FIG. 9 is a flow chart using the calculation method according to a third embodiment shown in FIGS. 8(A) to 8(E).

FIG. 9 is a flow chart using the calculation method shown in FIGS. 8(A) to 8(E).

In this embodiment, time intervals between the modulation sections are not constant. For example, in the example shown in FIGS. 8(A) to 8(E), the time interval between the first section 101 and the second section 201 corresponds to To shown in the above-described embodiments, and the time interval between the second section 201 and the fifth section 501 corresponds to To+dT obtained by adding a short time interval dT to To.

A mixer 7 generates IF beat signals in the first section 101, in the second section 201, and in the fifth section 501 serving as modulation sections adjacent to each other (S31).

A data processor 10 performs FFTs on the generated IF beat signals, and calculates the frequency spectra (S32). In the example shown in FIGS. 8(A) to 8(E), a frequency spectrum as shown in FIG. 8(B) can be obtained in the first section 101, a frequency spectrum as shown in FIG. 8(C) can be obtained in the second section 201, and a frequency spectrum as shown in FIG. 8(D) can be obtained in the fifth section 501.

Next, the data processor 10 detects peaks from the frequency spectra (S33). In the example shown in FIGS. 8(A) to 8(E), a peak frequency a1 is detected in the first section 101 (FIG. 8(B)), a peak frequency a2 is detected in the second section 201 (FIG. 8(C)), and a peak frequency a5 is detected in the fifth section 501 (FIG. 8(D)). At this moment, peaks obtained by performing FFTs appear in bins significantly close to each other as in the above-described embodiments since the repetition cycles correspond to To and To+dT obtained by adding the short time interval dT to the repetition cycle To. Thus, these peaks can be easily combined.

When the peak frequencies are detected in the above-described sections as described above, the data processor 10 calculates a phase difference $\phi12$ during the interval between the first section 101 and the second section 201 using the peak frequency a1 in the first section 101 and the peak frequency a2 in the second section 201 (S34). Furthermore, the data processor 10 calculates a phase difference $\phi25$ during the interval between the second section 201 and the fifth section 501 using the peak frequency a2 in the second section 201 and the peak frequency a5 in the fifth section 501 (S35).

Next, the data processor 10 calculates the candidate relative velocities Vj during the interval between the first section 101 and the second section 201 from the following expression using the phase differences $\phi12$ (S36).

$$Vj=\Delta r/To=(j+\phi12/(2\pi))\cdot\lambda/(2To)$$

Herein, j is an integer that satisfies $-n1 \leq j \leq m1$ when n1 and m1 are defined as integers set in accordance with a range of possible relative velocities of a target object.

Moreover, the data processor 10 calculates the candidate relative velocities Vk during the interval between the second section 201 and the fifth section 501 from the following expression using the phase differences $\phi25$ (S37).

$$Vk=\Delta r/(To+dT)=(k+\phi12/(2\pi))\cdot\lambda/(2(To+dT))$$

Herein, k is an integer that satisfies $-n2 \leq k \leq m2$ when n2 and m2 are defined as integers set in accordance with a range of possible relative velocities of the target object.

FIG. 8(E) illustrates the relationship between the candidate relative velocities Vj and the candidate relative velocities Vk. As shown in FIG. 8(E), Vj and Vk appear at intervals corresponding to the different repetition cycles of To and To+dT, respectively.

After the candidate relative velocities Vj and Vk are calculated in the above-described sections as described above, the data processor 10 determines degrees of matching between each pair of Vj and Vk (S38). Factors for determining the degrees of matching include, for example, degrees of coincidence in positions of velocities. Subsequently, the data processor 10 determines the best matched combination of Vj and Vk, for example, whose value of |Vj−Vk| is minimum, as a true relative velocity Vtrue (S39). At this moment, when Vj and Vk completely correspond to each other, the values of Vj and Vk are used without being changed. When there is a difference between Vj and Vk, a predetermined operation such as averaging the extracted Vj and Vk is conducted, and the true relative velocity Vtrue is detected.

When the true relative velocity Vtrue is detected in this manner, the data processor 10 calculates a Doppler shift ad using the following expression.

$$ad=Vtrue/\delta V=2f_0 \cdot Vtrue \cdot tm/C$$

Herein, $\delta V$, $f_0$, tm, and C indicate the velocity resolution of the radar apparatus also used in the above-described embodiment, a central frequency of the transmitted signal, a modulation period (time length during which the frequency is changed), and the light velocity.

The Doppler shift ad is in units of bins. A frequency change ar caused by a delay is calculated by correcting the peak frequencies a1, a2, and a5 obtained in the above-described sections using the Doppler shift. Herein, ar is in units of bins. For example, ar in the first section 101 is calculated from the following expression.

$$ar=a1+|ad|$$

Subsequently, a distance r between an automobile equipped with the radar apparatus and the target object is calculated by setting a distance resolution $\delta R$ of the radar apparatus as described above (S40).

$$r=ar \cdot \delta R$$

The relative distance between the automobile and the target object and the relative velocity of the target object with respect to the automobile can also be calculated accurately by this method.

Herein, the short time interval dT described above can be more effective when set using the following expression.

$$dT<\lambda/(2\cdot|Vmax-Vmin|)$$

where Vmax, Vmin, and $\lambda$ indicate a possible maximum relative velocity of the target object, a minimum relative velocity, and a wavelength corresponding to the central frequency $f_0$ of the transmission frequency, respectively. Setting the short time interval dT in this manner can lead only one combination of the candidates having the minimum difference during comparison between the candidate relative velocities Vj and Vk in the above-described sections. With this, the degrees of matching between the candidate relative velocities can be determined more easily.

In the above-described embodiments, the scanning function is described in detail only where necessary. However, the structures of the above-described embodiments can be applied to radar apparatuses having a function successively scanning transmitted beams in predetermined azimuthal directions. In this case, when the interval between two adjacent transmitted beams is smaller than a half-width of the transmitted beams, the two adjacent transmitted beams can be incident on an identical target object, and beams reflected from the target object can be received. With this structure, the modulation sections of the two adjacent transmitted beams can be regarded as modulation sections adjacent to each other in terms of time. Thus, measurement for the phase changes and measurement in the azimuthal directions can be conducted at the same time without setting the modulation sections in the same azimuths (beam transmitting directions) a plurality of times. As a result, radar apparatuses capable of accurately measuring relative velocities and relative distances of target objects and, at the same time, capable of detecting target objects in scanning directions while scanning in azimuthal directions can be realized using simple arithmetic processing.

The invention claimed is:

1. A radar apparatus comprising:
an electromagnetic-wave transmitting/receiving unit that transmits a beam of an electromagnetic wave as a transmitted wave and receives a reflected wave generated when the transmitted wave is reflected from a target, the electromagnetic wave including repeated modulation sections in which a frequency is changed over time in a predetermined frequency range; and an information detecting unit that detects information regarding the target on the basis of beat signals generated by mixing the transmitted wave and the received wave, wherein the information detecting unit includes:

a frequency-spectrum measuring unit that measures a frequency spectrum of a first beat signal in a first section of the transmitted wave in which the frequency of the transmitted wave is changed over time and a frequency spectrum of a second beat signal in a second section of the transmitted wave in which an inclination of frequency transition over time is the same as an inclination of frequency transition in the first section, the second section following the first section at a predetermined time interval; and a state-value detecting unit that compares a first peak group including peaks having strengths higher than a first predetermined level in the frequency spectrum of the first beat signal with a second peak group including peaks having strengths higher than a second predetermined level in the frequency spectrum of the second beat signal, calculates a phase change between a first peak included in the first peak group and a second peak included in the second peak group, the frequencies of the first and second peaks being substantially the same, calculates a relative moving distance using the phase change, and detects a relative velocity and a relative distance of the target corresponding to the first and second peaks using the relative moving distance.

2. The radar apparatus according to claim 1, wherein the frequency-spectrum measuring unit measures a frequency spectrum of a third beat signal in a third section adjacent to the first section or the second section and having an inclination of frequency transition over time opposite to the inclination of frequency transition in the first section, and the state-value detecting unit calculates candidate peaks in the third section using the detected relative velocity and determines degrees of matching between each of the candidate peaks and each peak in a third peak group including peaks having strengths higher than a third predetermined level in the frequency spectrum of the third beat signal, selects a best matched peak from the third peak group, and detects the relative velocity and the relative distance of the target corresponding to the best matched peak from the frequency of the best matched peak and the frequency of the first and second peaks.

3. The radar apparatus according to claim 1, wherein the frequency-spectrum measuring unit measures a frequency spectrum of a third beat signal in a third section preceding the first section by a predetermined time period and having the same inclination of frequency transition over time as the inclination of frequency transition in the first section, and the state-value detecting unit stores the frequency spectrum of the third beat signal in a storage portion; and calculates candidate peaks in the third section using the detected relative velocity, determines degrees of matching between each of the candidate peaks and each peak in a third peak group including peaks having strengths higher than a third predetermined level in the frequency spectrum of the third beat signal, and detects the relative velocity and the relative distance of the target corresponding to a best matched candidate peak.

4. The radar apparatus according to claim 1, wherein the frequency-spectrum measuring unit measures a frequency spectrum of a third beat signal in a third section following the second section at a second time interval that differs from a first time interval between the first section and the second section and having the same inclination of frequency transition over time as the inclination of frequency transition in the first section, and the state-value detecting unit calculates first candidate relative velocities of the target from the detected relative velocity; compares the second peak group with a third peak group including peaks having strengths higher than a third predetermined level in the frequency spectrum of the third beat signal, calculates a phase change between a third peak included in the third peak group and a peak included in the second peak group that has substantially the same frequency as the third peak, and calculates second candidate relative velocities of the target corresponding to the first and second peaks; and determines degrees of matching between the first candidate relative velocities and the second candidate relative velocities, detects a best matched candidate relative velocity as a true relative velocity, and detects the relative distance by determining a phase change from the true relative velocity.

5. The radar apparatus according to claim 4, wherein a time difference dT between the first time interval and the second time interval is determined using the following expression:

$$dT < \lambda/(2|V\max - V\min|)$$

where Vmax, Vmin, and $\lambda$ indicate a possible maximum relative velocity of the target, a possible minimum relative velocity, and a wavelength of the transmitted wave, respectively.

6. The radar apparatus according to claim 1, further comprising:

a scanning unit that successively scans the beams of the transmitted wave in azimuthal directions, and wherein the radar apparatus detects phase changes between two adjacent transmitted beams scanned by the scanning unit.

7. The radar apparatus according to claim 2, further comprising:

a scanning unit that successively scans the beams of the transmitted wave in azimuthal directions, and wherein the radar apparatus detects phase changes between two adjacent transmitted beams scanned by the scanning unit.

8. The radar apparatus according to claim 3, further comprising:

a scanning unit that successively scans the beams of the transmitted wave in azimuthal directions, and wherein the radar apparatus detects phase changes between two adjacent transmitted beams scanned by the scanning unit.

9. The radar apparatus according to claim 4, further comprising:

a scanning unit that successively scans the beams of the transmitted wave in azimuthal directions, and wherein the radar apparatus detects phase changes between two adjacent transmitted beams scanned by the scanning unit.

* * * * *

UNITED STATES PATENT AND TRADEMARK OFFICE
CERTIFICATE OF CORRECTION

PATENT NO.        : 7,466,260 B2
APPLICATION NO. : 11/946696
DATED              : December 16, 2008
INVENTOR(S)      : Toru Ishii et al.

It is certified that error appears in the above-identified patent and that said Letters Patent is hereby corrected as shown below:

On the title page, item:

(75) Inventors: Please delete "Toru Ishii, Nagaokakyo (JP)", and insert --Toru Ishii, Hirakata-shi (JP)--

Signed and Sealed this

Tenth Day of March, 2009

JOHN DOLL
*Acting Director of the United States Patent and Trademark Office*